United States Patent
Benantar et al.

(10) Patent No.: US 6,253,251 B1
(45) Date of Patent: *Jun. 26, 2001

(54) INFORMATION HANDLING SYSTEM, METHOD, AND ARTICLE OF MANUFACTURE INCLUDING INTEGRATION OF OBJECT SECURITY SERVICE AUTHORIZATION WITH A DISTRIBUTED COMPUTING ENVIRONMENT

(75) Inventors: Messaoud Benantar, Poughkeepsie, NY (US); George Robert Blakley, III; Anthony Joseph Nadalin, both of Austin, TX (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/582,550

(22) Filed: Jan. 3, 1996

(51) Int. Cl.[7] ........................................ G06F 9/54
(52) U.S. Cl. ............................................ 709/315
(58) Field of Search .................... 395/600, 603, 395/186, 200.55; 709/310–332, 200, 220, 240–244; 713/182–187

(56) References Cited

U.S. PATENT DOCUMENTS

| | | | |
|---|---|---|---|
| 4,919,545 | * | 4/1990 | Yu ............................................ 713/167 |
| 5,297,283 | * | 3/1994 | Kelly et al. ............................. 709/104 |
| 5,335,346 | * | 8/1994 | Fabbio et al. ......................... 711/163 |
| 5,414,852 | * | 5/1995 | Kramer et al. ........................ 709/104 |
| 5,450,493 | * | 9/1995 | Maher ...................................... 380/30 |
| 5,450,593 | * | 9/1995 | Howell et al. ......................... 713/200 |
| 5,519,867 | * | 5/1996 | Moeller et al. ........................ 709/107 |
| 5,742,826 | * | 4/1998 | Endicott et al. ....................... 709/315 |

OTHER PUBLICATIONS

SOMobjects Developer Toolkit, User's Guide, An introductory guide to the System Object Model, Version 2.0, pp. 6–1 thru 6–5, Jun 1993.*

* cited by examiner

*Primary Examiner*—St. John Courtenay, III
(74) *Attorney, Agent, or Firm*—Marilyn Smith Dawkins

(57) ABSTRACT

A system, method and article of manufacture for integrating object security service authorization in a distributed computing environment, includes one or more processors, a storage system, a system bus, a display sub-system controlling a display device, a cursor control device, an I/O controller for controlling I/O devices, all connected by system bus an operating system such as the OS/2* operating system program (OS/2 is a registered trademark of International Business Machines Corporation), one or more application programs for executing user tasks and an object oriented control program, such as, DSOM Objects program, which is a commercially available product of International Business Machines Corporation, the object oriented control program including mapping a set of methods defined by a given class to a finite and a fixed set of access rights from which a method required access rights set is assigned, and selecting the access rights set by examining two components, first, a family right type and, second, a set of permissions pertaining to each such family, where the rights type is the component which dictates semantics of its set of permissions. Two family types may be employed, operation rights and role rights. Scalability of embodiments of the invention may be demonstrated by the ability of adding new families of rights types along with a corresponding set of permissions for each family.

24 Claims, 2 Drawing Sheets

ID=1 INFORMATION HANDLING SYSTEM, METHOD, AND ARTICLE OF MANUFACTURE INCLUDING INTEGRATION OF OBJECT SECURITY SERVICE AUTHORIZATION WITH A DISTRIBUTED COMPUTING ENVIRONMENT

TECHNICAL FIELD OF THE INVENTION

The present invention relates to information handling systems, methods and articles of manufacture, and more particularly to information handling systems, methods and articles of manufacture for enhancing object security in an object oriented system.

1. Background of the Invention

There is a need to improve security in object oriented systems. Traditionally, controlling access to a resource implies determining whether or not data can be disclosed, altered, or modified. Access control in object oriented systems, however, presents different aspects and semantics. In object oriented systems, resources are objects consisting not only of data but also of operations that can manipulate and transform the object's data. As such, object access control is concerned with determination of which users can invoke what method on what object. Thus, access rights need to correspond to semantics of functionality and side effects of methods to which they apply. In the simplest case, this correspondence can be one to one. That is, a method M's required access rights can be uniquely identified in the class that defines it by the method's name, or simply M. Thus, a subject would have to acquire permission M in order to be able to invoke method M and expect its side effect. This approach, however, introduces a problem of scale as object oriented systems are likely to expose a very large number of types of operations (methods), each with a different signature and semantic. Since such access control to the protected objects of an application need to be tailored for that particular application in that the semantics of access rights or permissions are, generally, valid only for the application at hand. In addition, administering object access control becomes a complex task as the set of access rights or permissions rapidly grows in size with each newly introduced class library.

2. Prior Art

In the prior art there are many techniques for improving object oriented programming systems (OOPS).

The following are examples of the prior art.

U.S. Pat. No. 4,525,780 teaches a data processing system having a memory organized into objects, where the system uses a protection technique to prevent unauthorized access to objects by users which are identified by a subject number identifying the user, a process for executing a user's procedure and the type of system operation to be performed by the user's procedure. An access control list is maintained to control access to objects based on subject identifier.

U.S. Pat. No. 5,136,712 teaches an object based operating system for a multitasking computer system including means for making an object private to a process. Access to a private object is controlled by an access control list.

U.S. Pat. No. 5,265,221 teaches an access control mechanism for granting, revoking, and denying authorization to objects using a system of verbs, parameters, attributes and functions.

U.S. Pat. No. 5,297,283 and U.S. Pat. No. 5,321,841 appear to teach the same system as U.S. Pat. No. 5,136,712 discussed above.

U.S. Pat. No. 5,093,914 generally teaches a method used by a digital computer in controlling execution of an object oriented program to effect a defined action, for example, stopping the program when a specified virtual function is invoked on a specified object during execution of the program.

U.S. Pat. No. 5,343,554 teaches a computing system in which problems are solved by a process which includes creating objects of first and second classes wherein the second class objects are externally invocable and where the externally invocable sub-class objects include an indication of an internally invocable sub-class object and executing the class of objects wherein one externally invocable sub-object invokes the internally invocable sub-object and a new object of the first class is generated in response to the results.

Although the patents generally deal with methods for protecting access to objects in object oriented programs, the patents do not teach nor suggest solving the problem of scale by assigning and selecting a method required access right set as is taught and claimed herein with reference with the present invention.

There is a need to automatically add object services features, for example, persistence, recoverability, concurrency and security to a binary class. A related copending patent application S/N 08/537,648 teaches and claims automatically inserting object services into binary classes in an object oriented system. The teaching of U.S. patent application Ser. No. 08/537,648 is incorporated by reference herein. Sometimes the source code of a class is not available for modification. Even when the source code is available, a considerable reprogramming effort is required to add the object services features.

SUMMARY OF THE INVENTION

It is an object of the present invention to integrate object security service authorization in a distributed computing environment.

Accordingly, a system, method and article of manufacture, for integrating object security service authorization in a distributed computing environment, includes one or more processors, a storage system, a system bus, a display sub-system controlling a display device, a cursor control device, an I/O controller for controlling I/O devices, all connected by system bus an operating system such as the OS/2* operating system program (OS/2 is a registered trademark of International Business Machines Corporation), one or more application programs for executing user tasks and an object oriented control program, such as, DSOM Objects program, which is a commercially available product of International Business Machines Corporation, the object oriented control program including mapping a set of methods defined by a given class to a finite and a fixed set of access rights from which a method required access rights set is assigned, and selecting the access rights set by examining two components, first, a family right type and, second, a set of permissions pertaining to each such family, where the rights type is the component which dictates semantics of its set of permissions. Two family types may be employed, operation rights and role rights. Scalability of embodiments of the invention may be demonstrated by the ability of adding new families of rights types along with a corresponding set of permissions for each family.

It is an advantage of the present invention that object security in distributed object systems is improved by integrating object security service authorization in a distributed computing environment.

DETAILED DESCRIPTION OF A PREFERRED EMBODIMENT OF THE INVENTION

Figure 1:
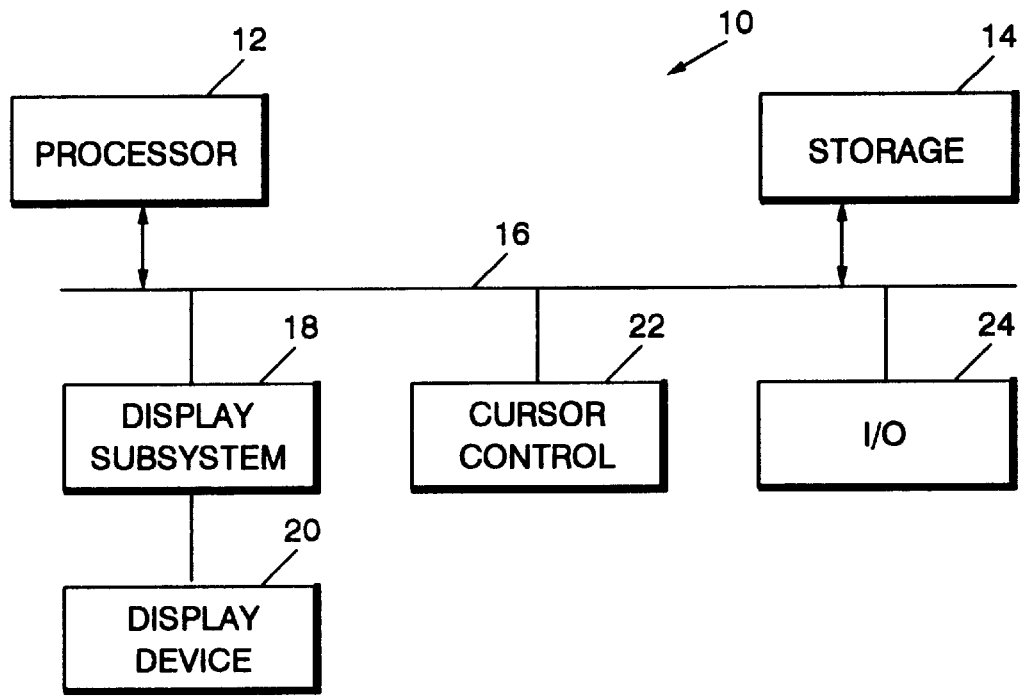
FIG. 1 is a block diagram of a system implementing the present invention.
Figure 2:
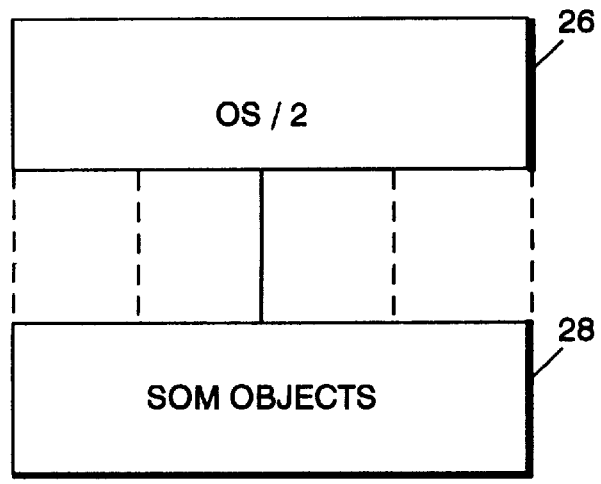
FIG. 2 is a block diagram showing the operating system platform and system object model program supporting the present invention.

Referring now to FIGS. 1 and 2, on information handling system 10 and an operating system environment for the present invention will be described.

Information handling system 10 may be a graphics work station or the like with one or more processors 12, a storage system 14, a system bus 16, display sub-system 18 controlling a display device 20, a cursor control device 22, and an I/O controller 24, all connected by system bus 16. The information handling system 10, shown in FIG. 1 may be operated by a commercially available well known multi-tasking operating system such as OS/2* (OS/2 is a registered trademark of International Business Machines Corporation). Among many tasks which the OS/2 operating system 26 controls in operating information handling system 10, is execution of an object oriented program, such as, DSOM Objects program 28, which is a commercially available product of International Business Machines Corporation.

The method of the present invention may be incorporated in the DSOM Objects program.

Access control to objects of a binary class are provided by the Secure object service. The Secure object service will be described.

The way the user specifies security is to specify the following constraints when searching for a class object:

name: secure value: A boolean indicating whether the object is protected by access control checking.

name: ACL value: If secure==TRUE, an access control list.

When granularity is per method, enforcement can be done either per method invocation or when a reference is first obtained (the capability approach). The capability approach can be implemented by building a security proxy object in the server for each combination of object and ACL (list of allowed methods) that has only the subset of methods that are allowed. The ORB (or at least the server object) would have to be modified to do this.

In controlling access to a resource, access rights or permission sets need to correspond to the semantics of the methods to which they apply. Administering object access control becomes a complex task as the set of access rights or permission rapidly grows in size with each newly introduced class library. To handle the scalability, a set of methods defined by a given class is mapped to a finite and fixed set of access rights from which a method required access rights set (MRAR) is assigned. The problem then becomes one of selecting the appropriate access rights set. By dividing the issue into two components, namely, a family rights type and a set of permissions pertaining to each such family, access control can be efficiently managed, even in systems having large numbers of sets of access rights or permissions.

In a preferred embodiment of the present invention, two standard family types are set forth, operation rights and role rights. The scalability issue is handled through the ability of the system to add new families of rights types along with a corresponding set of permissions for each such family. If a small number of family rights types, preferably limited to the standard types of operations and role types, is maintained with a fixed and small set of permissions within each family, access control and portability is enhanced.

Table 1 below illustrates the two standard rights types with associated rights and interpretation.

TABLE I

| Rights Types | | |
| --- | --- | --- |
| Rights Type | Right | Intended Interpretation |
| OPERATION_RIGHTS | R | Read |
| | W | Write |
| | X | eXecute |
| | C | Control |
| | D | Delete |
| | A | Append |
| ROLE_RIGHTS | G | Guest |
| | U | User |
| | O | Operator |
| | M | adMinistrator |
| | T | audiTor |
| | S | Super |

Figure 3:
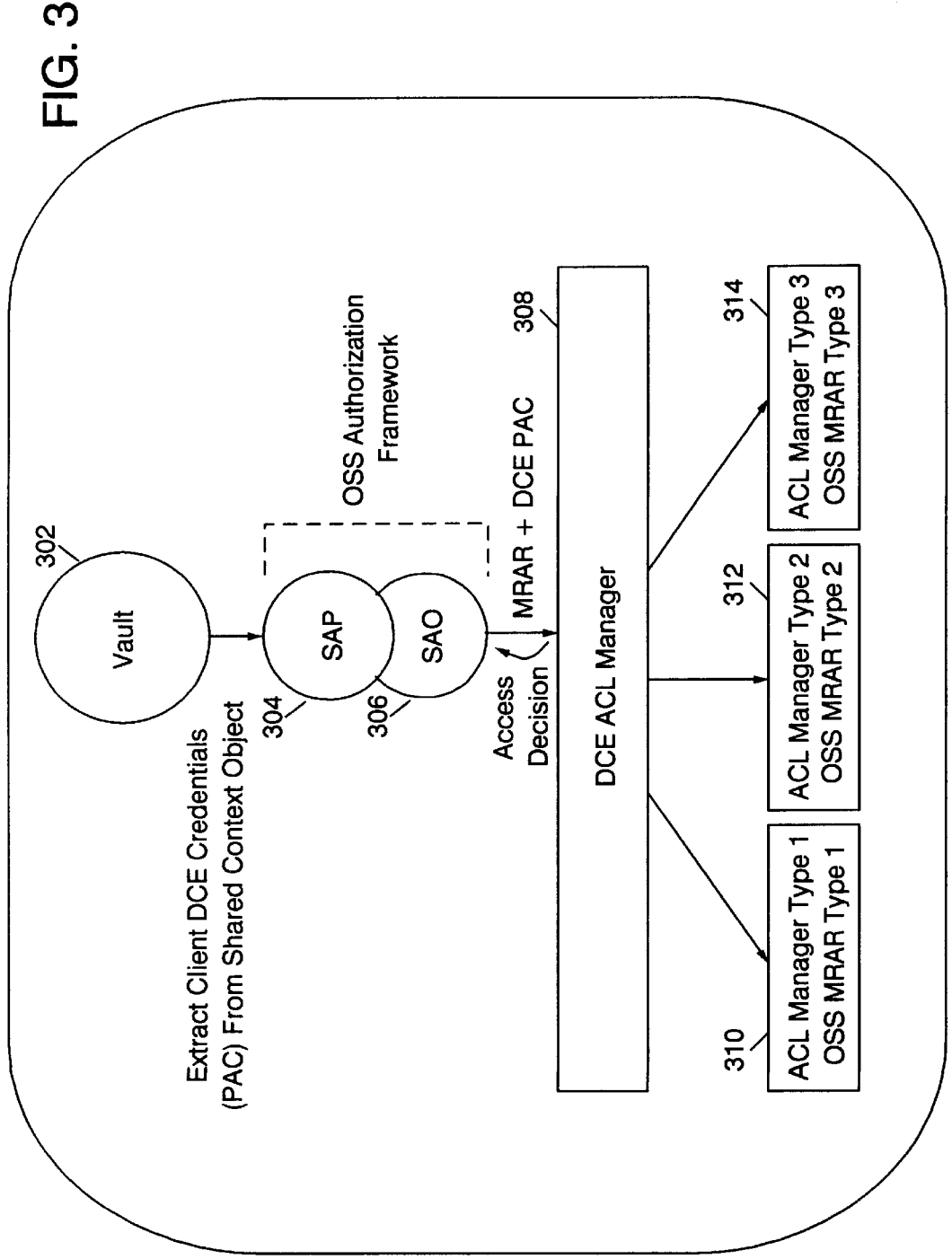
FIG. 3 is a schematic diagram of a distributed object system embodying the present invention.

Referring now to FIG. 3, the integration of the present invention with a distributed computing environment's authorization mechanism will be described. A security vault 302 (described in copending patent application Ser. No. 08/582,551 is the basic element of object security services. Authorization credentials are stored in vault 302 for each object. A client's DCE credentials are extracted from a shared context object and presented to system authorization policy object 304 which, in combination with system authorization oracle 306, makes authorization decisions based upon pre-established authorization policies. The authorization decision is passed from system authorization oracle 306 to DCE ACL manager 308. A method's MRAR rights type corresponds to a DCE ACL manager type, for example, ACL manager type 1 and MRAR type 1 (310), ACL manager type 2, MRAR type 2 (312), or ACL manager type 3, MRAR type 3 (314). The DCE manager type 310, 312, 314 can be retrieved by the DEC API:

sec_acl_mgr_types_semantics which returns a set of manager types corresponding to the ACLs protecting a given object. The DCE ACL corresponding to the semantic of the method's MRAR will then be applied during the process of authorization checking. By mapping a method's MRAR to a bit map string, a fast authorization checking will be performed.

Two access semantics are distinguished:

1. The AND semantic in which the entire MRAR set needs to be satisfied in order for the authorization check to be successful. this corresponds to setting the entire MRAR bit map as the desired access for the DCE authorization API:

sec_acl_test_access_on_behalf

2. The OR semantic where only one right out of the MRAR set needs to be satisfied. In this case, the bit map desired access flag will assume one bit at a time, spanning the MRAR set until a decision is encountered. Failing access will then have to span the entire MRAR set, whereas the first MRAR permission allowing for access will cause the authorization routine to return with a successful result.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. A process, for use in an object oriented distributed computing environment having a plurality of objects and a plurality of methods to be performed on the objects, for determining an authorization for invoking a given method on a given object, the process comprising:

creating a finite set of access rights required for authorization to invoke any of the methods;

classifying the methods into a finite set of groups wherein each group of methods has a separate one of the finite set of access rights and each method within each group has a method required access rights set assigned from the set of access rights wherein the finite set of access rights comprises a two part structure wherein the first part identifies an access right type and a second part identifies a set of permissions pertaining to the access right type wherein the type dictates the semantics of the set of permissions; and resolving an access right authorization credential by identifying the appropriate group of methods based upon a content of the two part structure indicating a desired set of access rights and invoking a desired method within the identified group if the method required access rights set of the desired method matches the access right authorization credential.

2. The process of claim 1 wherein each method within a same group of methods has a same method required access rights set.

3. The process of claim 1 wherein the access right type is identified from a group including an operation type and a role type.

4. The process of claim 1 wherein if a new method has a different method required access right that is a subset of one of the finite set of access rights, the new method is classified with the group of methods having the one finite set of access rights; and if the new method has a different method required access right that is a null subset of the finite set of access rights, the new method is classified with a new group of methods having a new set of access rights.

5. The process of claim 1 further comprising using an authorization mechanism designed for determining authorizations to an object by applying, during the process of authorization checking, object access parameters corresponding to the semantic of the method required access rights of the method.

6. The process of claim 1 wherein a content of the two part structure is represented in a bit map stream and further comprising checking the entire bit map stream to determine a match by determining a successful authorization check for an AND access semantic where each right of the method required access right for the method has to be satisfied.

7. The process of claim 1 wherein a content of the two part structure is represented in a bit map stream and further comprising checking the bit map stream one bit at a time to determine a match by determining a successful authorization check for an OR access semantic where only one right of the method required access right for the method has to be satisfied.

8. The process of claim 1 wherein the appropriate group is identified by initially identifying a desired group of methods based upon a desired access right type for the group of methods.

9. An authorization system, in an object oriented distributed computing environment having a plurality of objects and a plurality of methods to be performed on the objects, for determining an authorization for invoking a given method on a given object, the authorization system comprising:

means for specifying a finite set of access rights required for authorization to invoke any of the methods;

means for enabling a classification of the methods into a finite set of groups wherein each group of methods has a separate one of the finite set of access rights and each method within each group has a method required access rights set assigned from the set of access rights wherein the finite set of access rights comprises a two part structure wherein the first part identifies an access right type and a second part identifies a set of permissions pertaining to the access right type wherein the type dictates the semantics of the set of permissions; and means for resolving an access right authorization credential comprising means for identifying the appropriate group of methods based upon a content of the two part structure indicating a desired set of access rights, and means for invoking a desired method within the identified group if the method required access rights set of the desired method matches the access right authorization credential.

10. The authorization system of claim 9 further comprising means for enhancing scalability comprising means for adding a new method to an existing group of methods if the method required access right of the new method is a subset of one of the existing finite set of access rights, and means for adding the new method to a new group of methods having a new set of access rights if the new method required access right is a null subset of one of existing finite set of access rights.

11. The authorization system of claim 10 wherein the new set of access rights comprises a new access right type.

12. The authorization system of claim 10 further comprising means for indexing an invoking method based upon the access right type and means for comparing the set of permission pertaining to the access right type with the access right authorization credential.

13. A computer program, having computer readable program codes means on a computer usable medium, for use in conjunction with an object oriented distributed computing environment having a plurality of objects and a plurality of methods to be performed on the objects, for determining an authorization for invoking a given method on a given object, the computer program comprising:

means for enabling a specification of a finite set of access rights required for authorization to invoke any of the methods;

means for enabling a classification of the methods into a finite set of groups wherein each group of methods has a separate one of the finite set of access rights and each method within each group has a method required access rights set assigned from the set of access rights wherein the finite set of access rights comprises a two part structure wherein the first part identifies an access right type and a second part identifies a set of permissions pertaining to the access right type wherein the type dictates the semantics of the set of permissions; and means for enabling a resolution of an access right authorization credential comprising means for identifying the appropriate group of methods based upon a content of the two part structure indicating a desired set of access rights, and means for invoking a desired method within the identified group if the method required access rights set of the desired method matches the access right authorization credential.

14. A procedure for object access authorization in an object oriented distributed, client server, computing environment comprising the steps of:

grouping executable methods into classes;

determining a family type for each said class;

associating a plurality of permission types with each family type; and during access authorization of a method, finding the class of said method and thereafter comparing said plurality of permissions associated with the class of said method with a bit map representative of permissions associated with said client seeking to invoke a method on an object.

15. The procedure of claim 14 wherein:

said determining step comprises choosing from among operation and role family types.

16. The procedure of claim 15 wherein:

said associating step includes assigning a set of access rights permissions unique to each family type.

17. The procedure of claim 16 wherein:

said comparing step comprises retrieving an access control manager type corresponding to an access control list of an object.

18. Apparatus for use by an information handling system including, object oriented programming, in determining whether a method may be invoked on an object comprising:

means for assigning to each method from a set of access rights, required access rights using a two-part access rights code structure including a first part indicating a type and a second part indicating a set of permissions appertaining only to said type, wherein said type dictates a semantic of the set of permissions; and means for comparing the required access rights with a set of authorization credentials to perform authorization checking.

19. The apparatus of claim 18 wherein:

each method within a separate set of methods defined by a same class has a same set of required access rights.

20. The apparatus of claim 18 wherein:

the type is selected from a group including an operation type and a role type.

21. The apparatus of claim 18 further comprising:

means for assigning an additional at least one new type and a unique associated set of permissions to at least one set of methods.

22. The apparatus of claim 18 further comprising:

means for using an authorization mechanism designed for determining authorizations to an object by applying, during a process of authorization checking, object access parameters corresponding to the semantic of the required access rights of the method.

23. The apparatus of claim 18 further comprising:

means for checking the entire bit map stream to determine a successful authorization check for an AND access semantic, where each required access right has to be satisfied.

24. The apparatus of claim 18 further comprising:

means for checking the bit map stream one bit at a time to determine a successful authorization check for an OR access semantic, where only one right out of the required access rights for the method has to be satisfied.

* * * * *